United States Patent
Hall et al.

(10) Patent No.: US 9,096,026 B2
(45) Date of Patent: Aug. 4, 2015

(54) ADHESIVE DISPENSING PROFILE ENHANCEMENT

(75) Inventors: Robert S. Hall, Roanoke, VA (US); David Boyd, Roanoke, VA (US); Anthony Van Heugten, Sarasota, FL (US)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 13/445,509

(22) Filed: Apr. 12, 2012

(65) Prior Publication Data

US 2012/0267030 A1 Oct. 25, 2012

Related U.S. Application Data

(60) Provisional application No. 61/474,466, filed on Apr. 12, 2011.

(51) Int. Cl.
- *B29C 65/48* (2006.01)
- *B29D 11/00* (2006.01)
- *G02B 7/02* (2006.01)

(52) U.S. Cl.
CPC ...... *B29D 11/0073* (2013.01); *B29D 11/00951* (2013.01); *G02B 7/025* (2013.01)

(58) Field of Classification Search
CPC . B29D 11/0951; B29D 11/0073; G02B 7/025
USPC ............ 156/64, 99, 272.2, 275.5, 275.7, 295
See application file for complete search history.

(56) References Cited

U.S. PATENT DOCUMENTS

| | | | |
|---|---|---|---|
| 3,771,858 A | 11/1973 | Bivens | |
| 4,679,918 A | 7/1987 | Ace | |
| 4,980,993 A * | 1/1991 | Umezaki | 451/5 |
| 6,355,124 B1 | 3/2002 | Blomberg et al. | |
| 2003/0017340 A1 | 1/2003 | Jiang et al. | |
| 2004/0236454 A1* | 11/2004 | Weisser | 700/123 |
| 2005/0126700 A1* | 6/2005 | Makimoto et al. | 156/285 |
| 2005/0269721 A1* | 12/2005 | Adileh et al. | 264/1.32 |
| 2009/0256977 A1* | 10/2009 | Haddock et al. | 349/13 |
| 2009/0260568 A1 | 10/2009 | Chuang et al. | |
| 2011/0220278 A1* | 9/2011 | Rudmann et al. | 156/250 |

FOREIGN PATENT DOCUMENTS

| | | | |
|---|---|---|---|
| EP | 0359084 A2 | 3/1990 | |
| EP | 1004361 A2 * | 5/2000 | |

(Continued)

OTHER PUBLICATIONS

U.S. Appl. No. 61/474,466, filed Apr. 12, 2011.
U.S. Appl. No. 13/045,961, filed Mar. 11, 2011.

(Continued)

*Primary Examiner* — Daniel McNally
(74) *Attorney, Agent, or Firm* — Sterne, Kessler, Goldstein & Fox P.L.L.C.

(57) ABSTRACT

A first method is provided that comprises the steps of: measuring a first surface disposed on a first substrate, measuring a second surface disposed on a second substrate, calculating a variable gap between the first surface and the second surface, depositing a variable amount of adhesive on the first surface of the first substrate based at least in part on the calculation of the variable gap, and placing the second substrate over the first substrate, wherein the adhesive is disposed between the first surface of the first substrate and the second surface of the second substrate.

30 Claims, 6 Drawing Sheets

(56) References Cited

FOREIGN PATENT DOCUMENTS

| EP | 1411376 A1 | | 4/2004 |
|----|------------|---|--------|
| WO | WO 2009070568 A1 | * | 6/2009 |
| WO | WO 2010020062 A1 | * | 2/2010 |

OTHER PUBLICATIONS

International Preliminary Report on Patentability issued in International Appl. No. PCT/US2012/033358, mailed Oct. 24, 2013.
International Search Report issued in International Appl. No. PCT/US2012/033358, mailed Dec. 21, 2012.

* cited by examiner

Baseline Master Profile

HEIGHT ERROR

Probing Delta Profile Results

Reflection Lens Mapping

ADHESIVE DISPENSING PROFILE ENHANCEMENT

CROSS-REFERENCES TO RELATED APPLICATIONS

This application claims benefit under 35 U.S.C. §119(e) of U.S. provisional patent application No. 61/474,466, filed on Apr. 12, 2011, the entire disclosure of which is incorporated herein by reference for all purposes.

BACKGROUND OF THE INVENTION

As noted above, the technology generally available in the polymer lens casting process does not allow for tight enough (i.e. precise) control of the ROC of a substrate with any predictability in an efficient and cost effective manufacturing process. The relative lack of control over this process typically drives the cost of the top substrate (i.e. "Lid" substrate) up, limits the capacity based on the mold set available, and promotes "an in process pairing kanban" (i.e. substrates are chosen based on compatibility at the time of combination, rather than being interchangeable) for best fit with the available bottom substrate. Again, these issues drive cost up and capacity down, while promoting the need for re-work, over processing, and/or over production.

BRIEF SUMMARY OF THE INVENTION

A first method of manufacturing a composite lens may be provided. The first method may comprise the steps of measuring a first surface disposed on a first substrate, measuring a second surface disposed on a second substrate, calculating a variable gap between the first surface and the second surface, depositing a variable amount of adhesive on the first surface of the first substrate based at least in part on the calculation of the variable gap, and placing the second substrate over the first substrate, wherein the adhesive is disposed between the first surface of the first substrate and the second surface of the second substrate.

In some embodiments, in the first method as described above, the step of measuring the first surface of the first substrate may comprise measuring a radius of curvature of the first surface. In some embodiments, the step of measuring the second surface of the second substrate may comprise measuring a radius of curvature of the second surface. In some embodiments, the step of calculating the variable gap may comprise the steps of determining a difference in the radius of curvature of a portion of the first surface of the first substrate and the radius of curvature of a corresponding portion of the second surface of the second substrate.

In some embodiments, in the first method as described above, the step of measuring the first surface of the first substrate may comprise the step of measuring one or more topographical features of the first surface. In some embodiments, the step of measuring the second surface of the second substrate may comprise the step of measuring one or more topographical features of the second surface. In some embodiments, the step of calculating the variable gap may comprise determining a difference in the topographical features of a portion of the first surface of the first substrate and the topographical features of a corresponding portion of the second surface of the second substrate.

In some embodiments, in the first method as described above, the step of depositing the variable amount of adhesive may comprise ink-jet deposition.

In some embodiments, in the first method as described above, the step of depositing the variable amount of adhesive may comprise depositing a plurality of dots of adhesive on the first surface. In some embodiments, each of the plurality of dots may comprise approximately the same amount of adhesive. In some embodiments, depositing a variable amount of adhesive comprises depositing the plurality of dots at different intervals across the first surface.

In some embodiments, in the first method as described above, where depositing the variable amount of adhesive comprises depositing a plurality of dots of adhesive on the first surface, the amount of adhesive of the plurality of dots may vary by at least 5%. In some embodiments, the amount of adhesive of the plurality of dots may vary by at least 20%. In some embodiments, the amount of adhesive of the plurality of dots may vary by at least 50%.

In some embodiments, in the first method as described above, where depositing the variable amount of adhesive comprises depositing a plurality of dots of adhesive on the first surface, the plurality of dots may be deposited non-uniformly.

In some embodiments, in the first device as described above, the first method may further comprise the step of determining a first feature of the first substrate or the second substrate, and the step of depositing the variable amount of adhesive may be based at least in part on the first feature. In some embodiments, the first feature may comprise any one of, or some combination of: the area of the first surface, the area of the second surface, the shape of the first substrate, or the shape of the second substrate. In some embodiments, the first feature may comprise any one of, or some combination of: a location of a diffractive surface or a location of an electro-active element disposed on the first surface of the first substrate or the second surface of the second substrate.

In some embodiments, in the first method as described above, the first method may further comprise the step of adjusting the amount of adhesive deposited based on any one of, or some combination of: a level of heat, an ambient temperature, or humidity (or relative humidity).

In some embodiments, in the first method as described above, the first method may further comprise the steps of: determining the viscosity of the adhesive and adjusting the amount of adhesive deposited based at least in part on the determined viscosity. In some embodiments, the step of determining the viscosity of the adhesive comprises dispensing a plurality of dots of adhesive having a first weight at a first temperature, dispensing a plurality of dots of adhesive having a second weight at a second temperature; and calculating the temperature required to produce the desired weight.

In some embodiments, in the first method as described, further comprising the steps of determining a characteristic of a deposition mechanism and adjusting the amount of adhesive deposited based at least in part on the determination of the characteristic of a deposition mechanism. In some embodiments, the deposition mechanism may comprise any one of, or some combination of: the amount of error associated with an apparatus used in a deposition process, the heat applied to the adhesive deposited during deposition, the volume of adhesive typically deposited by the apparatus, or any other suitable parameter.

In some embodiments, in the first method as described above, the first method may further comprise the step of disposing an electro-active layer between the first and second substrates. In some embodiments, the first method may further include the steps of: disposing a first electrode and a second electrode between the first and the second substrates, and disposing the electro-active layer between the first and the second electrodes. In some embodiments, the electro-active layer may comprise a liquid crystal material.

In some embodiments, in the first method as described above, where the adhesive comprises a curable resin, the first method may further include the steps of curing the resin. In some embodiments, the step of curing the resin may comprise using any one of, or some combination of: chemical additives, ultraviolet radiation, an electron beam, or heat.

In some embodiments, in the first method as described above, the adhesive may be configured to couple the first substrate to the second substrate.

In some embodiments, in the first method as described above, the adhesive may comprise any one of, or some combination of: epoxy, polyurethane, acrylic, or cyanoacrylate.

In some embodiments, in the first method as described above, the adhesive may be formulated to match the refractive index of the substrates.

DETAILED DESCRIPTION OF THE INVENTION

Figure 1:
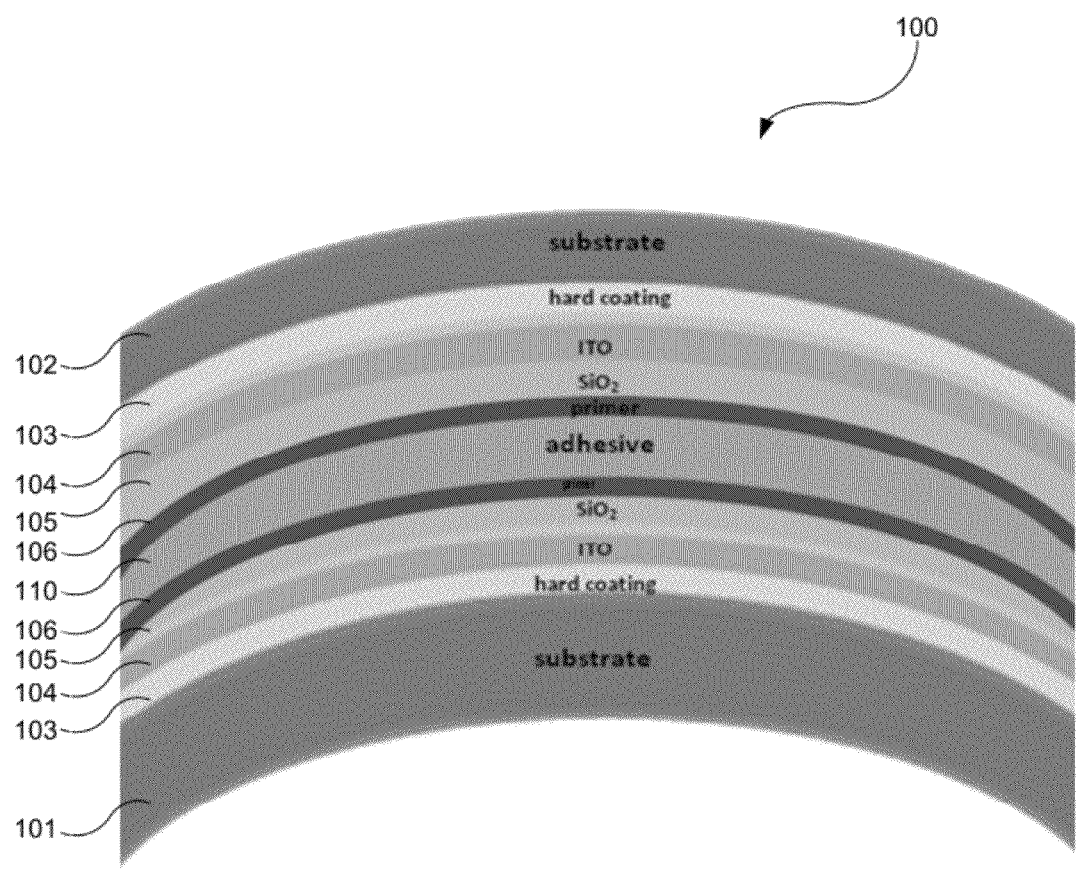
FIG. 1 shows a cross sectional view of an exemplary composite lens in the form of an electro-active lens in accordance with some embodiments.

Some terms that are used herein are described in further detail as follows:

As used herein, the term "alignment layer" may refer to a layer of material that controls the alignment of liquid crystals in the absence of an external field and often adheres to the surface of a substrate (such as an electrode, a lens, lens blank, lens wafer, etc.).

As used herein, the term "approximately" may refer to plus or minus 10 percent, inclusive. Thus, the phrase "approximately 10 mm" may be understood to mean from 9 mm to 11 mm, inclusive.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim or to describe an embodiment. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, a "conductive path" refers to a continuous path for which electrons (i.e. current) may flow from one point to another. The conductive path may comprise one component, or more than one component. For instance, a conductive path may comprise portions of a lens housing, a temple, a hinge, a lens, and/or conductive material disposed between (or within) some or all of the components.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw, an adhesive, or embedding a first component into a second component during a manufacturing process), but does not so require. Two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "diffractive element" may refer to a diffractive pattern that may be disposed on the surface of a substrate such as, by way of example only, etching, grinding or molding the surface. Such an optic may comprise a physical structure which is patterned to have a fixed optical power and/or aberration correction, by way of a surface relief diffractive topological profile.

As used herein, a "dynamic lens" may refer to a lens with an optical power which is alterable with the application of electrical energy, mechanical energy or force. Either the entire lens may have an alterable optical power, or only a portion, region or zone of the lens may have an alterable optical power. The optical power of such a lens is dynamic or tunable such that the optical power can be switched between two or more optical powers. The switching may comprise a discrete, change from one optical power to another (such as going from an "off" or inactive state to an "on" or active state) or it may comprise continuous change from a first optical power to a second optical power, such as by varying the amount of electrical energy to a dynamic element (e.g. tunable). One of the optical powers may be that of substantially no optical power. A dynamic lens may also be referred to as a dynamic optic, a dynamic optical element, a dynamic optical zone, dynamic power zone, or a dynamic optical region.

As used herein, a "frame" may refer to a complete wearable housing that secures both spectacle lenses and aligns them in the proper place relative to the wearer's eyes when being worn. The frame may comprise elements such as a first and second temple, a lens housing that is configured to support the spectacle lenses, one or more hinges, and any other related component.

As used herein, the term "layer" does not require a uniform thickness of material. For example, a layer may comprise some imperfections or uneven thicknesses so long as the layer performs its intended purpose.

As used herein, a "lens" may refer to any device or portion of a device that causes light to converge or diverge. The device may be static or dynamic. A lens may be refractive or diffractive. A lens may be concave, convex or plano on one or both surfaces. A lens may be spherical, cylindrical, prismatic or a combination thereof. A lens may be made of optical glass, plastic or resin. A lens may also be referred to as an optical element, an optical zone, an optical region, an optical power region or an optic. It should be noted that within the optical industry a lens can be referred to as a lens even if it has zero optical power. Moreover, a lens may refer to both intra-ocular and extra-ocular components.

As used herein, a "lens blank" may refer to an optical material that may be shaped into a lens. A lens blank may be finished meaning that the lens blank has been shaped to have an optical power on both external surfaces. A lens blank may be semi-finished meaning that the lens blank has been shaped to have an optical power on only one external surface. A lens blank may be unfinished meaning that the lens blank has not been shaped to have an optical power on either external surface. A surface of an unfinished or semi-finished lens blank may be finished by means of a fabrication process known as free-forming or by more traditional surfacing and polishing.

As used herein, a "lens housing" may refer to a part of the frame that is configured or adapted to support or hold the first and the second lenses in place (preferably firmly in place). The lens housing may also comprise the part of the frame to which the temples attach. The lens housing may comprise any component or material adapted to support the lenses, including, for example, screws, nylon monofilament, eye-wire, etc. or any combination thereof. The lens housing may comprise any material, including metal or plastic. A lens housing may be included in any type of frame design, including fully rimmed, semi-rimless, and rimless. In some embodiments, the lens housing may also include the bridge, such as when the lens housing comprising a single component or two components that support both the first and the second lens.

As used herein, a "multi-focal lens" may refer to a lens having more than one focal point or optical power. Such lenses may be static or dynamic. Examples of static multifocal lenses include a bifocal lens, trifocal lens or a Progressive Addition Lens. Examples of dynamic multifocal lenses include electro-active lenses whereby various optical powers may be created in the lens depending on the types of electrodes used, voltages applied to the electrodes and index of refraction altered within a thin layer of liquid crystal. Multifocal lenses may also be a combination of static and dynamic. For example, an electro-active element may be used in optical communication with a static spherical lens, static single vision lens, and static multifocal lens such as, by way of example only, a Progressive Addition Lens.

As used herein, "optical communication" may refer to the condition whereby two or more optics of given optical power are aligned in a manner such that light passing through the aligned optics experiences a combined optical power equal to the sum of the optical powers of the individual elements.

As used herein, an "ophthalmic lens" may refer to a lens suitable for vision correction, which may include a spectacle lens, a contact lens, an intra-ocular lens, a corneal in-lay, and a corneal on-lay.

As used herein, a "progressive addition region" or "progressive addition zone" may refer to a lens having a first optical power in a first portion of the region and a second optical power in a second portion of the region wherein a continuous change in optical power exists there between. For example, a region of a lens may have a far viewing distance optical power at one end of the region. The optical power may continuously increase in plus power across the region, to an intermediate viewing distance optical power and then to a near viewing distance optical power at the opposite end of the region. After the optical power has reached a near-viewing distance optical power, the optical power, may decrease in such a way that the optical power of this progressive addition region transitions back into the far viewing distance optical power. A progressive addition region may be on a surface of a lens or embedded within a lens. When a progressive addition region is on the surface and comprises a surface topography it may be known as a progressive addition surface.

As used herein, a "substrate" is a component that is generally well-known in the field of optics. A substrate typically refers to the component of a lens that is first fabricated or provided, and on which additional layers or materials may be deposited. A substrate may have dimensions on the order of millimeters or fractions of millimeters, whereas coatings and other deposited layers on the substrate typically have dimensions (i.e. thicknesses) that are on the order of microns. Examples of substrates may include, for example, lens blanks, semi-finished lens-blanks, or lens wafers.

In general, composite lenses comprise two or more substrates that may include one or more elements or layers of material disposed between the substrates (or in some instances, the composite lens may consist essentially of two substrates, typically with different optical features (such as refractive index) or physical features (such as density, hardness, etc.). Examples of composite lenses include electro-active semi-finished lens blanks (SFB), which may contain an upper substrate (e.g. a "Lid") and a bottom substrate (which may comprise a diffractive element or pixelated electrodes). The substrates are typically held together by an adhesive (such as a resin material) among several other layers (for example, the adhesive may be disposed directly on the substrate, or may be disposed over one or more layers of material that are also disposed over the substrate). An example of a composite lens in the form of an electro-active lens is shown in FIG. 1.

In particular, FIG. 1 shows a cross-sectional view of an exemplary composite lens in the form of an electro-active lens 100. The exemplary lens 100 comprises a plurality of layers of materials disposed between a first substrate 101 and a second substrate 102. The exemplary layers disposed between the first 101 and second 102 substrates include: hard coat layers 103 (e.g. to improve durability and/or increase scratch resistance); two opposing electrodes 104 (shown in this example as comprising indium tin oxide (ITO), but could typically comprise any suitable material such a transparent conductive oxide (TCO)), insulating layers 105 (shown in this example as comprising $SiO_2$) disposed between the electrodes 104; primer material layers 106 (e.g. to prevent or reduce the absorption of the adhesive into a more porous material or to further provide impact resistance); and an adhesive layer 110. In the example lens 100 shown in FIG. 1, the electro-active layer (that may, for instance, comprise liquid crystals), which is disposed between the first and second electrodes 104, is not shown in this cross-sectional view because in this example the electro-active element does not cover the entire surface of the first 101 or second 102 substrate. That is, for example, the adhesive layer 110 and/or one or more of the other layers may surround (or substantially surround) one or more sides of the electro-active layer. Disposing the electro-active element over less than the entire surface of one of the substrates may provide some advantages, such as the ability to edge the composite lens 100 (e.g.

remove material from around the edges of the composite lens 100 to form a particular shape or size) without interfering with or damaging the electro active-element. However, embodiments are not so limited, and in some instances, the electro-active layer may be disposed over an entire surface of the first or second substrate.

It should be noted that the layers in FIG. 1 are not drawn to scale. Moreover, the layers shown are for illustration purposes only, and embodiments are not so limited and may include additional layers of materials (such as one or more alignment layers for the electro-active material that may comprise liquid crystals) and/or omit one or more of the layers shown in FIG. 1. Moreover, although a preferred embodiment may comprise an electro-active lens (e.g. comprising an electro-active element), as noted above embodiments are not so limited.

The inventors have found that when manufacturing composite lenses (such as the electro-active lens 100 shown in FIG. 1), it is generally desirable to control the amount and/or positioning of the material of the adhesive layer (e.g. resin) such that excess (or deficient) amounts of adhesive are not applied to the surface of the first substrate before the second substrate is disposed over this surface (and coupled thereto by the adhesive). This may enable two substrates having different surface topographies or radii of curvature of opposing surfaces to be effectively coupled together, while also potentially reducing the amount of waste in the form of excess adhesive that is removed from the edges of the lens after the substrates have been coupled together. Moreover, with reference to electro-active lens embodiments, the inventors have found that if an excess amount of adhesive is disposed over the surface of the substrate, there is an increased likelihood that some of the adhesive may contaminate the electro-active material (i.e. when two substrates are brought together, the excess adhesive material may be forced into a cavity or area in which the electro-active element may be disposed within). This could thereby affect the performance of the electro-active material. Furthermore, if too little adhesive is applied to an area of the surface of the substrate, then the first and second substrates may not be adequately coupled (or portions of the substrates may not be adequately coupled), which may affect the structural integrity of the composite lens.

The inventors have also found that although the first surface (i.e. top surface) of the first substrate and the second surface (i.e. bottom surface) of the second substrate (where the first surface of the first substrate is disposed opposite to the second surface of the second substrate) may each be designed so as to have a radius of curvature that is approximately equal across the entire interface between the surfaces, in practice when such substrates are fabricated, there may be various imperfections in one or both surfaces that may result in a variable cavity (or gap) between the corresponding portions of the surfaces the substrates when the second substrate is disposed over the first substrate (i.e. when the substrates are coupled together). Indeed, even relatively minor variations in the surfaces and/or radius of curvature of the surfaces may affect the distances between the substrates when the composite lens is fabricated (i.e. when the second substrate is placed over the first substrate). The differential cavity created between the substrates (or the layers disposed on the substrates) is illustrated in FIGS. 3 and 4 and described in more detail below. Moreover, in some instances, portions of the substrates may be designed to have different radius of curvatures in different sections, which may also create differences in the distances between corresponding portions of the two substrates when they are brought together and coupled by the adhesive.

The differences in the distances between corresponding portions of the two substrates (e.g. the gap between the substrates or the layers disposed thereon) may result in the thickness of the adhesive layer varying across the substrate (i.e. the adhesive layer may not comprise a layer of material having a uniform thickness). Thus, the inventors have discovered that applying a uniform layer of adhesive material (or applying a uniform deposition process, such as applying uniform "dots" of adhesive material) may result in some portions of the surface of the first substrate having too much adhesive material, thereby creating an overflow of material (and/or waste), and other portions of the substrate having too little adhesive material to adequately couple the first and second substrates when the second substrate is disposed (i.e. placed) over the first substrate. Moreover, the discrepancies in the surface profiles of the two substrates may create cosmetic deficiencies that may be noticeable to a wearer.

Provided herein is an improved method for manufacturing a composite lens that includes the steps of dispensing an adhesive material (e.g. resin) onto a first surface of a first substrate and then applying (i.e. placing) a second substrate (e.g. the "Lid") over the first surface. As noted above, disposing the adhesive material onto the surface of a substrate may include dispensing the adhesive material over one or more layers that may be disposed on the surface of the substrate. Once the two surfaces are joined (i.e. coupled) by the adhesive material and all (or most) of the foreign particulates (e.g. trapped gasses) are exhausted, the adhesive material may then be cured (or any other suitable process may be performed so that the adhesive layer creates a bond between the three components—i.e. the adhesive layer and the two substrates).

It may be preferred in some instances that the concave surface (i.e. "second surface" or "bottom surface") of the second substrate (i.e. "Lid" or "top substrate") have a radius of curvature (ROC) that substantially matches the ROC of the convex surface (i.e. "first surface" or "top surface") of the first substrate (i.e. "bottom substrate") in all meridians such that the delta between the ROC of the corresponding portions of the substrates is roughly between 1.0 mm to 0.20 mm (depending on the target ROC). In general, the larger the target ROC, the more variation between the ROC of the second surface of the second substrate (i.e. the concave surface of the "Lid" substrate) and the first surface of the first substrate (i.e. the convex surface of the bottom substrate) may be allowed. Similarly, the smaller the target ROC, the less variation between the ROC of the second surface of the second substrate (i.e. the concave surface of the "Lid" substrate) and the first surface of the first substrate (i.e. the convex surface of the bottom substrate) may be allowed. In general, the ROC of the second surface of the second substrate (i.e. the concave surface of the "Lid" substrate) should be larger (or flatter) than the first surface of the first substrate (i.e. the convex surface of the bottom substrate) such that the second substrate can extend so as to be disposed up to the edge of the first substrate.

As noted above, the technology generally available in the polymer lens casting process does not allow for tight enough (i.e. precise) control of the ROC of a substrate with any predictability in an efficient and cost effective manufacturing process. The relative lack of control over this process typically drives the cost of the top substrate (i.e. "Lid" substrate) up, limits the capacity based on the mold set available, and promotes "an in process pairing kanban" (i.e. substrates are chosen based on compatibility at the time of combination, rather than being interchangeable) for best fit with the available bottom substrate (which for electro-active composite lenses may, but need not, comprise a diffractive element). Again, these issues drive cost up and capacity down, while promoting the need for re-work, over processing, and/or over production (particularly when attempting to achieve a good emPower!—i.e. electro-active—assembled SFB).

In this regard, the inventors have discovered a process in which the opposing surfaces of two substrates of a composite lens are measured to determine distances between corresponding portions of the substrates when the two substrates are coupled by an adhesive material. The measured distances may then be used to dispose a varying amount of the adhesive between the different corresponding portions of the surfaces of the substrates. In this way, for example, substrates having large discrepancies in corresponding surfaces (or relatively large differences in ROCs) may be used in a composite lens without resulting in large excesses or deficiencies of adhesive material. Moreover, any cosmetic or structural deficiencies based on such gaps may be compensated for with an increase or decrease in the amount of adhesive applied in that area of the substrates. This may reduce manufacturing costs (including the need for precise surfacing or machining of the substrates and/or additional processing to correct such errors) as well as to increase capacity and enable more substrates to be compatible for use together despite large discrepancies in corresponding surface profiles.

Exemplary Measurement, Calculation & Reference, and Dispensing Process

Provided below is an example of a measurement, calculation/reference, and dispensing process for determining the surface profiles of the substrates of a composite electro-active lens and disposing an adhesive layer between those surfaces in accordance with some embodiments. It should be understood that any suitable method of measurement of the surface profiles, calculation of the differential gap between the substrates, referencing the differential gap to the master profile, and/or disposing an adhesive layer in accordance with those determinations may be utilized. Moreover, although described below with reference to electro-active lenses, embodiments are not so limited.

In some embodiments, to optimize the adhesive (e.g. resin) dispensing profile between the top substrate (i.e. "Lid" substrate) and the bottom substrate (e.g. the "Diffractive Substrate" for some electro-active embodiments), the concave side (bottom surface) of the top substrate ("Lid" substrate) and the convex side (top surface) of the bottom substrate may be measured across the entire surface (typically 80.0 mm) and at a resolution equal to or better than 0.10 mm for the ROC. It should be noted that in some embodiments, only portions of the substrates may be measured (e.g. in some instances, portions of the surfaces of the substrates corresponding to areas that may not comprise adhesive material—e.g. corresponding to the electro-active area of an electro-active lens—may be omitted from the measurement process). A person of ordinary skill in the art would generally know how to make such measurements. For example, there are a variety of industry standard devices that have this capability. Traditional Coordinate Measurement Mapping (CMM), 3D Lens mapping by light reflection, or other touch or non-touch measurement devices are examples of measurement devices that can be instituted with respect to these measurements.

Figure 2:
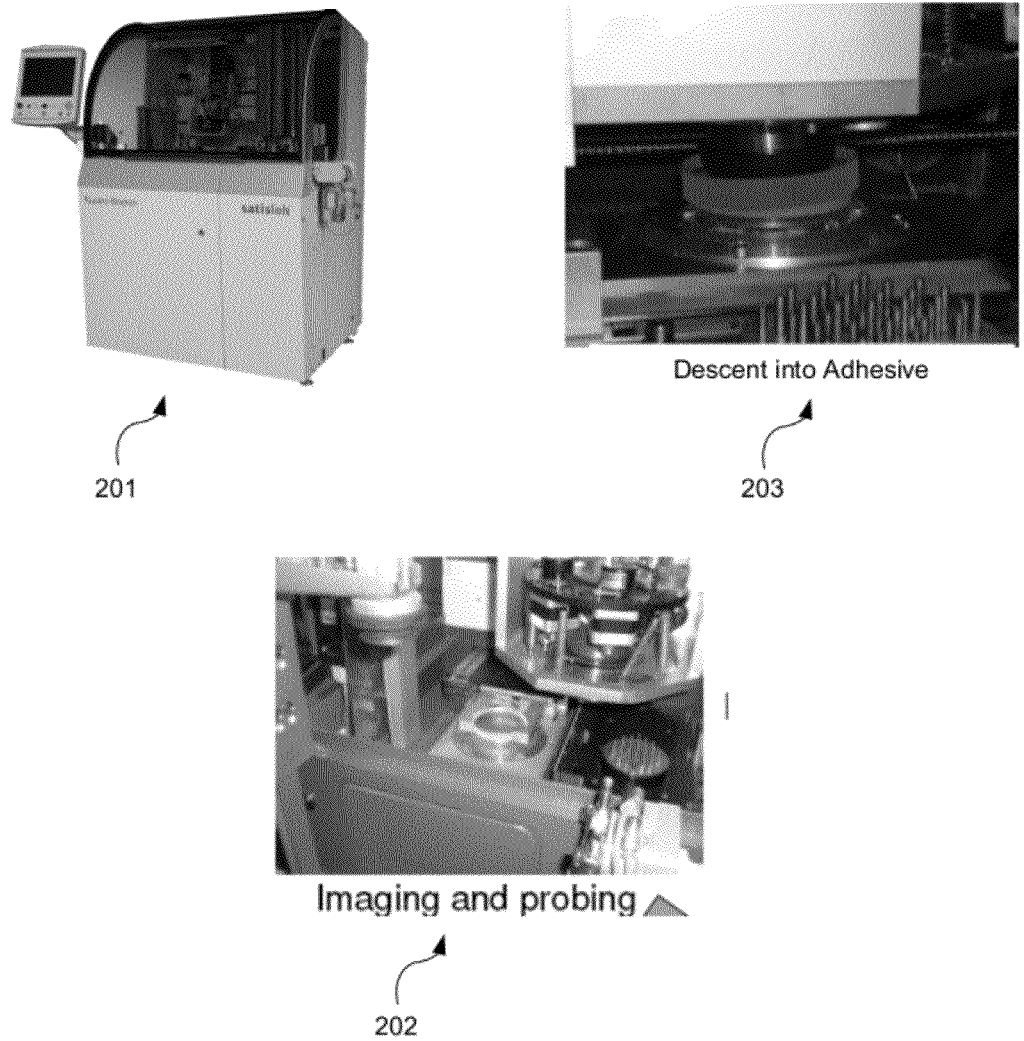
FIG. 2 shows images of exemplary apparatuses that may be used to perform one or more steps of exemplary embodiments provided herein.

FIG. 2 comprises photographs of a commercially available system manufactured by Satisloh® that may be used to apply adhesive to a lens or substrate for purposes other than (or in addition to) applying a variable adhesive layer. In particular, 201 shows the machine with the cover closed, 202 shows the imaging and probing (measuring) section of the machine, and 203 shows the adhesive application.

Figure 3A:
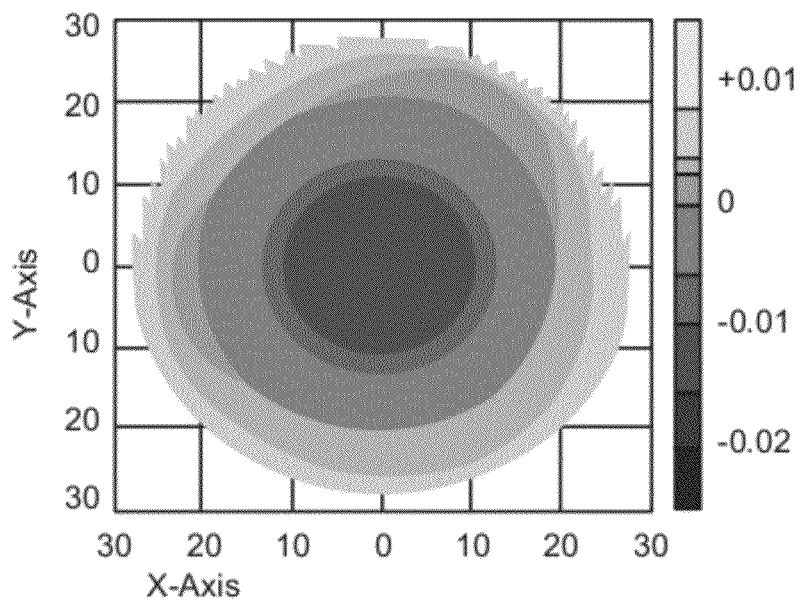
FIG. 3(a) shows an exemplary graphical representation of the measurement of the radius of curvature (ROC) of the surface of an exemplary master baseline substrate.
Figure 3B:
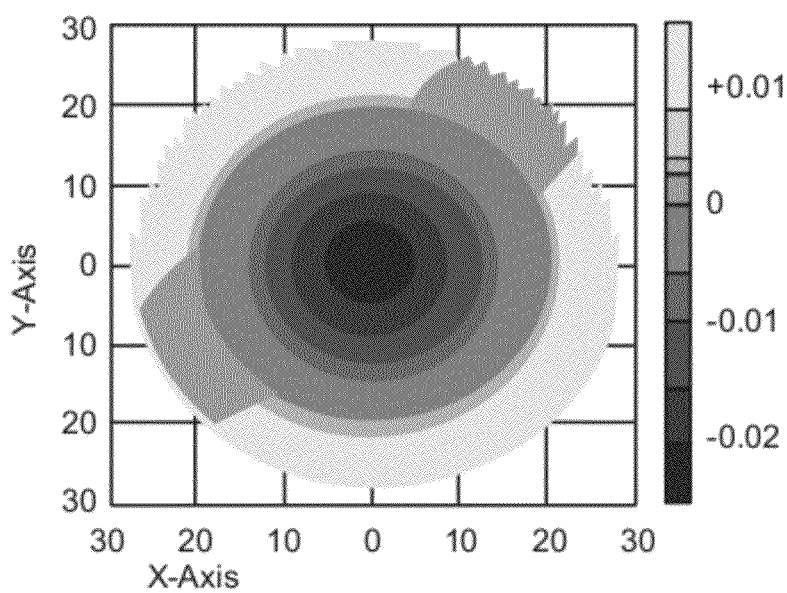
FIG. 3(b) shows an exemplary graphical representation of the measurement of the ROC of a surface of a fabricated substrate corresponding to the baseline substrate using typical manufacturing techniques.
Figure 4:
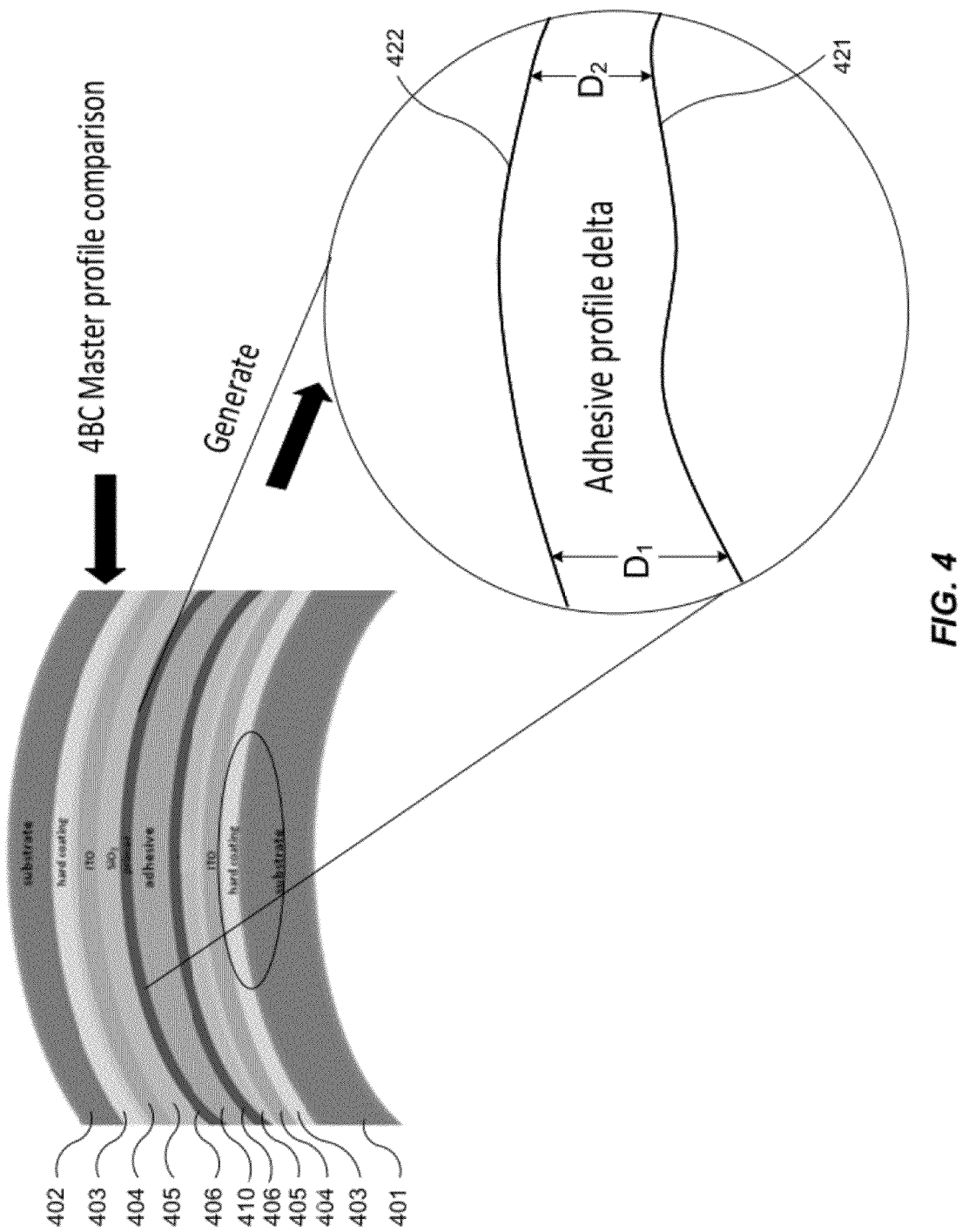
FIG. 4 shows a cross sectional view of the exemplary electro-active lens of FIG. 1 as well as a close up of the adhesive profile delta (corresponding to the variable gap between corresponding portions of the opposing surfaces of the two substrates) in accordance with some embodiments.

FIGS. 3(a) and (b) provide illustrations of exemplary CMM mappings of a high minus lens corresponding to (1) a baseline master profile of a target surface topography of a substrate (FIG. 3(a)), and (2) a representative surface topography of an exemplary fabricated substrate (FIG. 3(b)). That is, FIG. 3(a) shows the design of the intended topography and ROC of a surface of a substrate, whereas the CMM image shown in FIG. 3(b) represents the topography and ROC created by various manufacturing errors and variation that may occur during typical fabrication processes used in commercial production of such substrates. As shown in this example, the target baseline master profile has a height of approximately −0.01 at its center, which gradually increases moving away from the center to a height of around 0.005 at its periphery (note that the heights are measured relative to an arbitrary reference point). In contrast, the height of the surface of the exemplary manufactured substrate after probing using a CMM device is approximately −0.03 at its center and increases to above 0.01 near the periphery. Thus, in this example, there is a significant difference in the variation of the surface topographical profiles (e.g. the relative height of corresponding portions of the surface of substrates) across the baseline master substrate and the manufactured substrate. Moreover, the topography of the surface of the baseline master profile is relatively symmetrical around the center of the substrate, whereas the surface topography and ROC of the exemplary manufactured substrate (at least near the periphery of the substrate) is not symmetrical.

The differences in the two surface topographies and ROC profiles shown in FIGS. 3(a) and (b) demonstrate the relative variation that may be created during typical commercial fabrication processes. The inventors determined that in general, utilizing either a uniform thickness for the adhesive layer, or an adhesive layer having a thickness that is disposed based only on the target baseline topographical and ROC profile, may not provide an efficient manner for determining the amount of adhesive to be disposed over different portions of the substrates. Therefore, the measurements (such as the CMM measurements of the exemplary substrate shown in FIG. 3(b)) of the corresponding surfaces of each of the first and second substrates may be determined and utilized in developing a dispensing profile for the adhesive layer.

Once the surfaces of both the Lid (i.e. top substrate) and bottom substrate have been measured (e.g. using CMM or other suitable method), a three dimensional profile corresponding to the distances between corresponding portions of the substrates may be calculated. This profile may be used in determining the amount and/or location of the disposition of the adhesive material. An example of such a profile is shown in FIG. 4.

FIG. 4 shows an example of a profile for an exemplary cavity (or gap) between two of the surfaces of substrates 401 and 402 (or layers disposed on the surfaces of the substrates) of an exemplary electro-active lens. For illustration purposes, the layers of the composite electro-active lens 400 are shown as comprising the same materials as the composite electro-active lens in FIG. 1. That is, the exemplary composite electro-active lens comprises hard coat layers 403; two opposing electrodes 404; insulating layers 405 disposed between the electrodes 404; primer material layers 406; and an adhesive layer 410. Again, for illustration purposes only, the electro-active layer is not shown.

The close-up view in the bottom right of FIG. 4 provides a cross-sectional view of an "adhesive profile delta" that may be calculated by determining the distances created by the differences in the topographical features and ROC of corresponding portions of the bottom surface 422 of the top substrate 402 and the top surface 421 of the bottom substrate 401. For example, $D_1$ may represent the distance between the substrates (and thereby the desired thickness of the adhesive layer 410 in that location) created by the difference in the topographical features and/or ROC of corresponding portions of the top surface 421 of the bottom substrate 401 and the bottom surface 422 of the top substrate 402 in a first location. Similarly, $D_2$ may represent the distance between the substrates (and thereby the desired thickness of the adhesive layer 410 in that location) created by the difference in the topographical features and/or ROC of corresponding portions of the top surface 421 of the bottom substrate 401 and the bottom surface 422 of the top substrate 402 in a second location. As shown in the example in FIG. 4, $D_1$ and $D_2$ may have different values, which illustrates that the adhesive profile delta (i.e. the cavity or gap between the substrates) may vary across the surfaces of the substrates. The adhesive profile delta corresponding to the variations in the distances created by the topographical features of the first and second substrates may thereby be calculated, and an overall profile for the adhesive layer may be determined.

Once the above calculation is complete, the determined profile may then be referenced to the master profile (i.e. the target profile) for the corresponding design ROC of the surfaces of the substrates so as to take into account all geometric features related to a preferred assemble. That is, for instance, if optical features were designed based on the interface of the substrates, the differences in the ROC and/or topographical features of corresponding portions of the substrates, or if one or both of the surfaces comprises a portion corresponding to an electro-active element (e.g. a diffractive element or patterned electrodes), those optical features or elements may be considered with regard to the application of the adhesive layer. This is illustrated for instance in FIG. 5, which shows an exemplary substrate 500 comprising a plurality of features which are not intended to have a portion of the adhesive layer disposed over. For example, the exemplary substrate 500 is shown as comprising an electro-active element 501 having a diffractive seal structure 502 (an example of which is described in U.S. application Ser. No. 12/408,973, filed on Mar. 23, 2009, which is incorporated by reference herein in its entirety); a safety zone 503 comprising a space allotment for adhesive capillary flow (e.g. a portion of the substrate that allows for excess adhesive to flow into before contacting the electro-active element 501); and escape channels 504 that may be used in some, but not all embodiments, to allow gas and other foreign particulates to escape from between the substrates when the top substrate is disposed over the substrate 500. The locations of each of these features may also be considered in determining the adhesive dispensing profile.

Once this reference between the master profile and the calculation of the three dimensional profile (i.e. the adhesive profile delta) has been completed, a Dispensing Profile may be developed and then sent to the adhesive (e.g. resin) dispensing unit for the relevant application of the adhesive layer to the surface of the substrate(s).

In addition to the determined adhesive profile delta and the master profile of the substrates, the Dispensing Profile may also be based in-part on the particular technique and apparatus used to dispose the adhesive layer on the surface of the substrate. Although any suitable technique may be used to dispose the adhesive layer on the substrate surface, in some embodiments the layer may be dispensed in a dot matrix type pattern with each dispensed dot precisely applied with respect to X-Y and Z location of a known substrate feature (e.g. a diffractive reference), while also taking into account the dot volume as it relates to the dispensing calculation. In some instances, each "dot" of adhesive material may be measured during application and can be adjusted by the calculation for the upcoming dot as it relates to factors such as heat, humidity and repeatability of the dispensing system itself.

Figure 5:
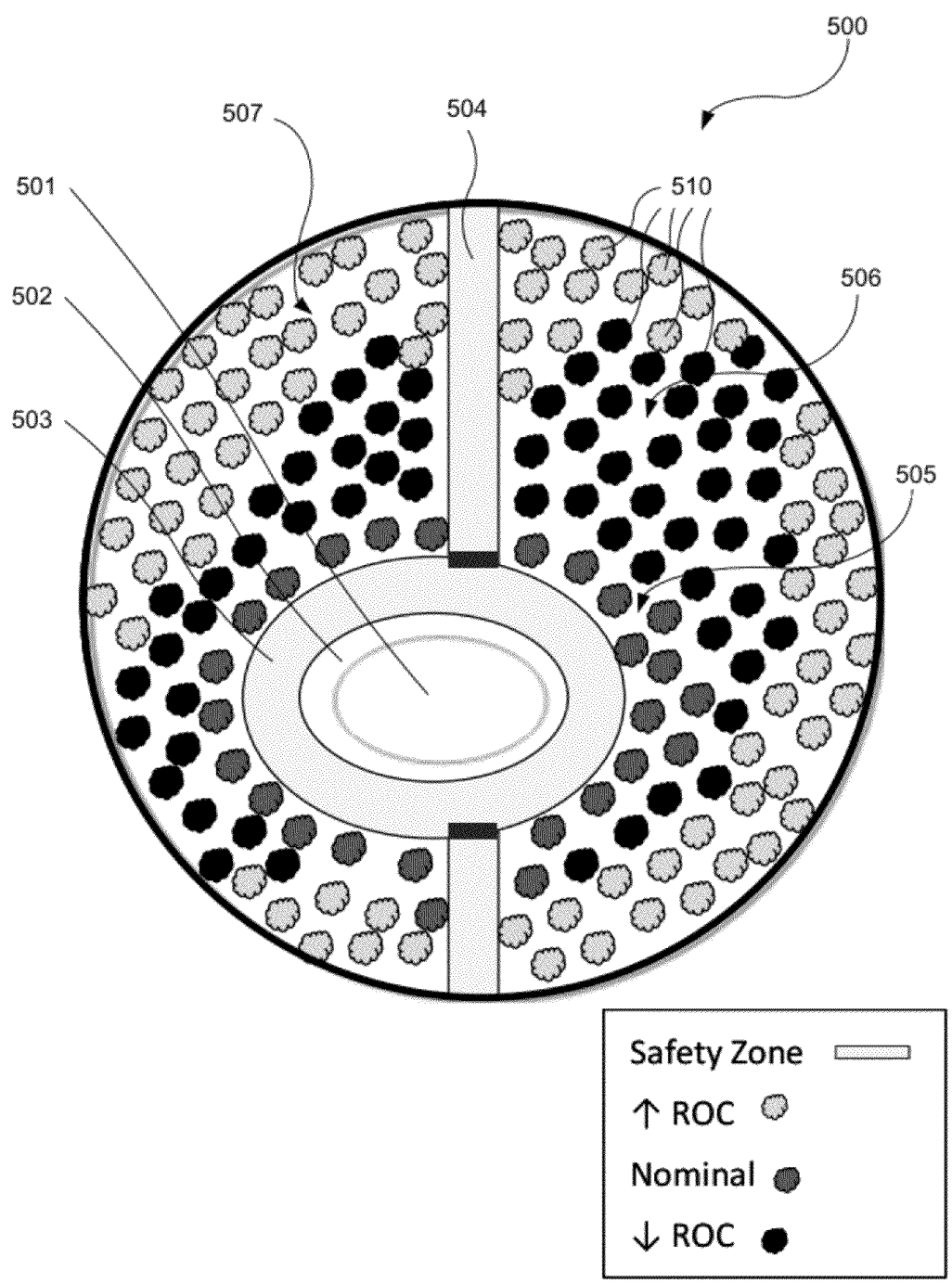
FIG. 5 shows an exemplary substrate of an electro-active lens having a varying adhesive profile in the form of a plurality of dots disposed over a surface in accordance with some embodiments.
Figure 6:
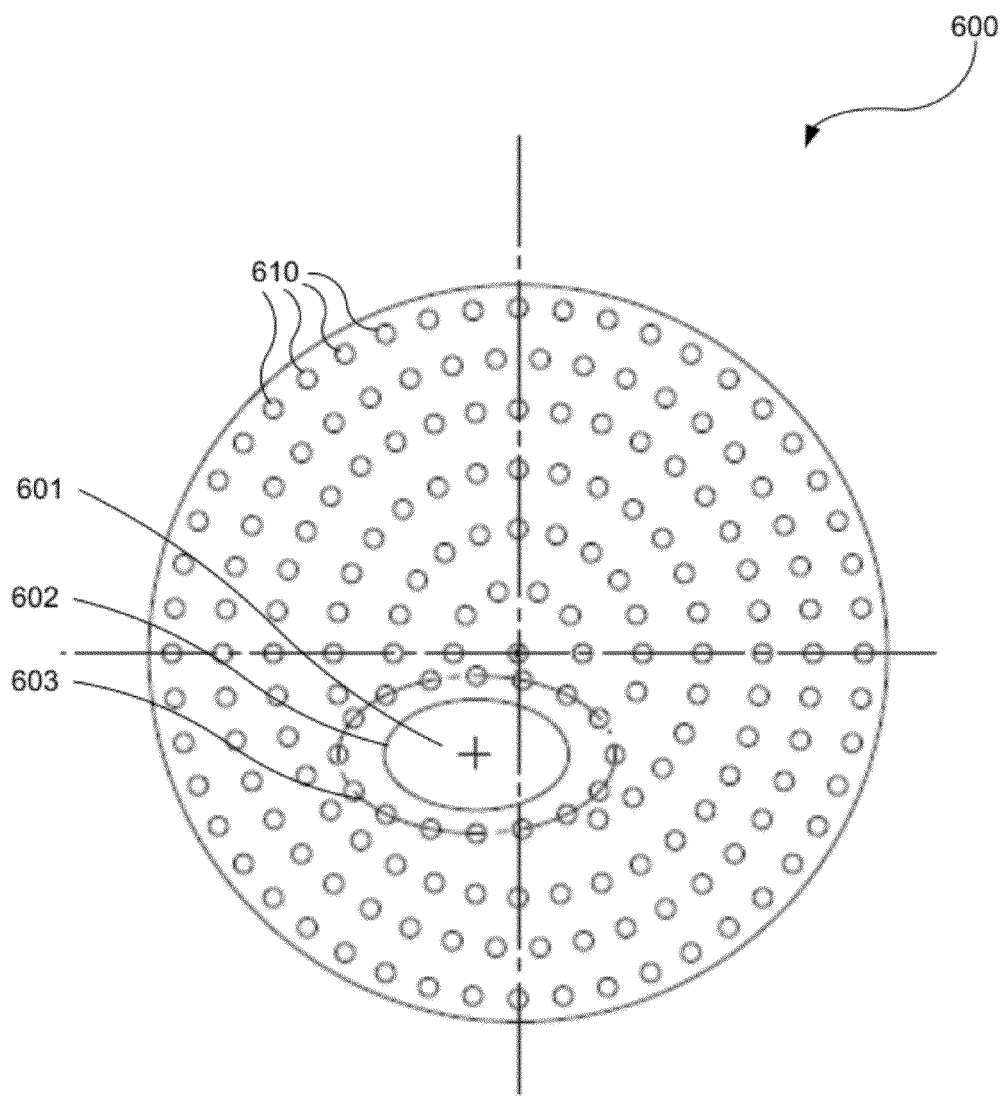
FIG. 6 shows an exemplary substrate of an electro-active lens having a varying adhesive profile in the form of a plurality of dots disposed over a surface in accordance with some embodiments.

FIGS. 5 and 6 show exemplary adhesive profiles for embodiments in which the adhesive layer may be deposited by dispensing a plurality of dots of adhesive materials over a surface of the substrate. With reference again to FIG. 5, the adhesive profile is shown as comprising a plurality of adhesive dots 510 that form three distinct regions for illustration purposes only. As shown in this example, the first region 505 of the surface of the substrate 500 is disposed around the electro-active area 501 (and more specifically around the safety zone 503) and is shown as comprising only a nominal amount of adhesive material (which may correspond to only incidental material forming over this region from disposing adhesive in other areas, or could be in the form of adhesive dots 510 having a very small volume and/or being spaced very far apart over this portion of the substrate 500). Disposing only a nominal amount of adhesive material in this area may reduce the likelihood of excessive adhesive material entering into the electro-active region 501 of the electro-active lens when the top substrate is disposed (i.e. placed) over the substrate 500. The second region 506 of the exemplary substrate 500 is shown as comprising a low volume of adhesive material (e.g. resin), which may correspond to adhesive dots 510 having relatively low volume in this area of the substrate 500 or the adhesive dots 510 being spaced relatively far apart (or a combination thereof). The second region 506 may therefore correspond to portions of the substrates that are disposed relatively close to one another (e.g. where the distance of the adhesive profile delta shown in FIG. 4 is relatively small). The third region 507 of the exemplary substrate 500 is shown as comprising a high volume of adhesive material, which may correspond to adhesive dots 510 having relatively high volume in this area of the substrate 500 or the adhesive dots 510 being spaced relatively close together (or a combination thereof). The third region 507 may therefore correspond to portions of the substrates that are disposed relatively far apart (e.g. where the distance of the adhesive profile delta shown in FIG. 4 is relatively large).

The inventors have found that the distance between the bottom substrate and the top substrate of a composite electro-active lens typically increases when moving in a direction away from the electro-active element, and therefore the volume of adhesive material may generally increase towards the periphery of the substrate in such embodiments. This may be due, in part, to the increase in differential of the ROC of the two substrates towards their peripheries. However, embodiments are not so limited, and in general the adhesive Dispensing Profile may be dictated based on the particular ROC and/or surface topography of each substrate.

FIG. 6 shows another exemplary substrate 600 having an adhesive dispensing profile of adhesive dots 610 disposed on a surface thereof in accordance with some embodiments. The exemplary substrate 600 comprises an electro-active region 601 (which may, for instance, comprise a diffractive structure). An electro-active seal structure 602 may be disposed around the electro-active element or region 601. As shown in this example, the adhesive profile generally comprises two distinct patterns of adhesive dots 610—the first comprises concentric rings (or ellipses) formed around the center of the substrate 600 (except for near the region of the electro-active element 601); and the second pattern comprises a single ring (or ellipse) around the electro-active region 601 (e.g. disposed on or around a "safety zone" disposed a distance away from the electro-active seal structure 602). In some embodiments, the volume of the adhesive dots 610 may vary based on the particular ROC and topographical features of each of the substrates (which may, in turn, determine the adhesive profile delta shown in FIG. 4).

Continuing with reference to FIG. 6, an exemplary deposition process to form the example adhesive profile may be as follows. As shown in FIG. 6, the adhesive dots 610 are dispensed in concentric circles around the center of the substrate 600. The amount of adhesive of each of the dots 610 in each of the circular patterns (or the density of the adhesive layer corresponding to each of the circular patterns) may increase the farther the circular pattern is from center of the substrate 600 to compensate for the increase in the gap between the substrates. For example, the density of adhesive material corresponding to each concentric ring may be increased by decreasing the speed of the dispensing head (when using an ink jet deposition process) so the adhesive dots 610 are disposed closer together on the surface of the substrate 600. As noted above, the elliptical pattern 603 around the electro-active region or element 601 is shown as separate from the other circular patterns. In some embodiments, the location and composition of the elliptical pattern 603 may be adjusted so that the adhesive fills in uniformly around the electro-active element 601 (without contaminating the material disposed therein). The amount of adhesive in the elliptical pattern 603 may also be adjusted (by, for instance, changing the speed of the deposition apparatus) so that the adhesive material fills around the electro-active region 601 without completely going inside this area.

It should be appreciated that the exemplary adhesive dispensing profiles shown in FIGS. 5 and 6 were provided for illustration purposes only. As noted above, any suitable dispensing profile may be used, including profiles that may not comprise the use of adhesive dots (e.g., some embodiments may apply an adhesive layer of varying thickness or may apply a uniform layer of adhesive material which is then patterned to appropriate thicknesses, etc.).

Exemplary Embodiments

Described below are exemplary embodiments of methods of manufacturing composite lenses, and preferably electro-active lenses, that may comprise depositing a variable amount of an adhesive material (e.g. a resin) based on the topographical features and/or the ROC of the surfaces of one or both substrates of the lens. The embodiments described herein are for illustration purposes only and are not thereby intended to be limiting. After reading this disclosure, it may be apparent to a person of ordinary skill in the art that various components and/or features as described below may be combined or omitted in certain embodiments, while still practicing the principles described herein.

A first method of manufacturing a composite lens may be provided. The first method may comprise the steps of measuring a first surface disposed on a first substrate, measuring a second surface disposed on a second substrate, calculating a variable gap between the first surface and the second surface, depositing a variable amount of adhesive (e.g. resin) on the first surface of the first substrate based at least in part on the calculation of the variable gap, and placing the second substrate over the first substrate, wherein the adhesive is disposed between the first surface of the first substrate and the second surface of the second substrate.

As used in this context, a "variable amount" may refer to when the amount of adhesive material over a portion of the first substrate is different than the amount of adhesive that is deposited over another portion of the first substrate. That is, for example, the adhesive is not deposited as a uniform layer having a uniform thickness. The thickness of the layer may be varied by any suitable means. For example, where a variable gap is present, the gap at a first portion between the substrates may be different than the variable gap between a second portion of the substrates and as a result a first amount of adhesive may be deposited over the first portion of the first substrate, and a second amount of adhesive may be deposited over the second portion of the first substrate, where the first amount and the second amount are different.

As used in this context, a "variable gap" may refer to when the distance between the first surface and the second surface (or one or more layers disposed on the first surface and the second surface) of the first and second substrates, respectively, is different (i.e. varies) at different locations over the surfaces of the substrates. As described above, this may be the result of manufacturing errors or practical limitations when fabricating the opposing surfaces of two substrates that are intended to have matching ROCs and/or surface topographies (or could be the result of intentional differences in the corresponding portions of the surfaces). By determining the variable gap created by the differences in the surface topographies and/or ROCs of corresponding portions of the substrates (or any other factor), the inventors have found that the adhesive disposed between these different portions of the substrates may be varied to correspond to the difference distances (i.e. the variable gap) and provide a more efficient adhesive dispensing profile.

In some embodiments, in the first method as described above, the step of measuring the first surface of the first substrate may comprise measuring a radius of curvature of the first surface. As noted above, the ROC of the surface of a substrate may be determined using any suitable method known in the art, including CMM, 3D Lens mapping by light reflection, or other touch or non-touch measurement devices. In some embodiments, the step of measuring the second surface of the second substrate may comprise measuring a radius of curvature of the second surface. In some embodiments, the step of calculating the variable gap may comprise the steps of determining a difference in the radius of curvature of a portion of the first surface of the first substrate and the radius of curvature of a corresponding portion of the second surface of the second substrate. As noted above, the ROC of each of the surfaces may affect the relative distances between each of the substrates at different locations along their surfaces when the substrates are coupled together in a composite lens. The determined difference between the ROCs of corresponding portions of the surfaces of each substrate may be utilized as a parameter to calculate the variable gap at a plurality of positions between the substrates—that is, the determination of the difference in the ROC's may be used as part of the determination of the difference in the distances between the substrates over the entire surface (or parts of the surface) of the substrates. It should be appreciated that other factors may also be considered in determining the variable gap, including the topographical features on one or both surfaces of the substrates. A determination may then be made for the corresponding thicknesses of an adhesive layer disposed at each location on the substrate. An adhesive profile (e.g. the amount and location of adhesive that may be deposited at each location on a substrate) may also be determined based, in part, on the calculation of the variable gap.

As used in this context, a "corresponding portion" of the second surface may refer to the portion of the second surface that is (or will be) disposed over (i.e. in optical communication with) the portion of the first surface of the first substrate when the first and the second substrates are coupled together. That is, as shown in FIG. 4, corresponding portions of the surfaces of the substrates may be used to determine the distances $D_1$ and $D_2$ of the adhesive profile delta.

In some embodiments, in the first method as described above, the step of measuring the first surface of the first substrate may comprise the step of measuring one or more topographical features of the first surface. A "topographical feature" may refer to any structure or feature that may be disposed on the surface of the substrate (such as a groove, indent, ridge, mound, etc.) or imperfections (such as material that was not removed during fabrication or additional material that was unintentionally added, chips or scratches in the surface of the substrate, etc.). In some embodiments, the step of measuring the second surface of the second substrate may comprise the step of measuring one or more topographical features of the second surface. In some embodiments, the step of calculating the variable gap may comprise determining a difference in the topographical features of a portion of the first surface of the first substrate and the topographical features of a corresponding portion of the second surface of the second substrate.

Similar to embodiments that may comprise measuring the ROC of the opposing surfaces of the first and second substrate, the difference in topographical features of corresponding portions of the surfaces of the substrates may also effect the amount of adhesive material that may be needed to be disposed in that region of the composite lens and may therefore also be measured and considered in determining the variable gap between the substrates. In some embodiments, both the ROC and surface topography may be measured to determine the variable gap between the first and second substrates.

In some embodiments, in the first method as described above, the step of depositing the variable amount of adhesive may comprise ink-jet deposition. In general, the adhesive layer may be deposited using any suitable method; however, the inventors have found that it may be preferred to deposit the adhesive layer using ink jet deposition because, for example, it may be a cost effective and efficient manner of dispensing the variable amount of adhesive across the surface of the substrate. For example, adhesive layer profiles may be readily programmed into a computer processor used to control an ink jet deposition apparatus, and may be adjusted for each instance of a new substrate pair without costly realignment of masks or other partnering techniques.

In some embodiments, in the first method as described above, the step of depositing the variable amount of adhesive may comprise depositing a plurality of dots of adhesive on the first surface. Exemplary embodiments that comprised adhesive "dots" were described above with reference to FIGS. 5 and 6. In some embodiments, each of the plurality of dots may comprise approximately the same amount of adhesive. In some embodiments, depositing a variable amount of adhesive may comprise depositing the plurality of dots at different intervals across the first surface. It should be noted that this language does not require that all of the adhesive dots disposed on the substrate be deposited at different distances from one another or over different intervals of the first surface. That is, some of the dots could be disposed at the same distance from one another or at the same intervals in one region of the device, where at least some of the dots may be deposited at different distances from one another. It should be noted that a "dot" may comprise any regular (e.g. circular square, triangle, etc.) or irregular shape, and generally refers to different segments of material that (at least after being disposed on the surface of the substrate) may be physically separated from each of the other dots disposed on the surface.

In some embodiments, in the first method as described above, where depositing the variable amount of adhesive comprises depositing a plurality of dots of adhesive on the first surface, the amount of adhesive of the plurality of dots may vary by at least 5%. That is, for instance, the volume or amount of adhesive material of at least one of the dots disposed on the surface may be at least 5% less than the volume or amount of material of at least one of the other adhesive dots. In some embodiments, the amount of adhesive of the plurality of dots may vary by at least 20%. In some embodiments, the amount of adhesive of the plurality of dots may vary by at least 50%. In general, the greater the variance in the distances (e.g. gap) between corresponding portions of the substrates, the greater the variance in the volume of the adhesive material of the dots in some embodiments.

In some embodiments, in the first method as described above, where depositing the variable amount of adhesive comprises depositing a plurality of dots of adhesive on the first surface, the plurality of dots may be deposited non-uniformly. As noted above, any suitable manner for varying the adhesive layer disposed on the substrate may be used, including varying the distance of adjacent adhesive dots, varying the volume of the adhesive dots, or a combination thereof.

In some embodiments, in the first device as described above, the first method may further comprise the step of determining a first feature of the first substrate or the second substrate, and the step of depositing the variable amount of adhesive may be based at least in part on the first feature. In some embodiments, the first feature may comprise any one of, or some combination of: the area of the first surface, the area of the second surface, the shape of the first substrate, or the shape of the second substrate. In some embodiments, the first feature may comprise any one of, or some combination of: a location of a diffractive surface or a location of an electroactive element disposed on the first surface of the first substrate or the second surface of the second substrate. As was noted above, in addition to the varying distance between the substrates, embodiments may also determine (e.g. with reference to a master profile) the location of one or more features that may not have an adhesive layer disposed over, or may otherwise alter or change the adhesive layer disposed over (or near) the feature.

In some embodiments, in the first method as described above, the first method may further comprise the step of adjusting the amount of adhesive deposited based on any one of, or some combination of: a level of heat, an ambient temperature, or humidity (or relative humidity). That is, for instance, certain adhesive materials and deposition processes may be affected by external conditions that could affect the dispensing apparatus (e.g. the amount of material that is deposited), as well as the characteristics of the adhesive materials (e.g. viscosity) that may thereby necessitate taking such factors into consideration to ensure that the appropriate amount of adhesive material is deposited.

In some embodiments, in the first method as described above, the first method may further comprise the steps of: determining the viscosity of the adhesive and adjusting the amount of adhesive deposited based at least in part on the determined viscosity. In some embodiments, the step of determining the viscosity of the adhesive comprises dispensing a plurality of dots of adhesive having a first weight at a first temperature, dispensing a plurality of dots of adhesive having a second weight at a second temperature; and calculating the temperature required to produce the desired weight. An exemplary process that the inventors have discovered comprises the following: First, 100 drops of adhesive dots may be deposited at each of 40° C. and at 50° C. Each sample is weighed carefully. For most adhesive materials (e.g. resins) it is generally known that viscosity is less with higher temperature and that 100 drops dispensed at 50° C. will weigh more than 100 drops dispensed at 40° C. A standard computer processor and software program may then be used to calculate the equation that describes the relationship between weight and temperature for the particular adhesive material based on these measurements. Next, the temperature can then be measured and the viscosity calculated to provide the same weight for each deposition process, regardless of changes in the ambient temperature. Using this exemplary method, even though the adhesive ages and the viscosity changes over time, the amount of adhesive dispensed may remain relatively consistent.

In some embodiments, in the first method as described, the first method may further comprise the steps of determining a characteristic of a deposition mechanism and adjusting the amount of adhesive deposited based at least in part on the determination of the characteristic of a deposition mechanism. In some embodiments, the deposition mechanism may comprise any one of, or some combination of: the amount of error associated with an apparatus used in a deposition process, the heat applied to the adhesive deposited during deposition, the volume of adhesive typically deposited by the apparatus, or any other suitable parameter. As noted above, other factors may affect the deposition process (including the amount of adhesive materials deposited), and may therefore need to be accounted for in the process.

In some embodiments, in the first method as described above, the first method may further comprise the step of disposing an electro-active layer between the first and second substrates. As used in this context, disposing may comprise dispensing or otherwise depositing the electro-active layer between the first and second substrates. As noted above, although embodiments are not so limited, the methods described herein may be particularly beneficial for use in electro-active lenses because when the adhesive is deposited between the two substrates, some of the excess adhesive may contaminate the electro-active area when the first and the second substrates are brought together.

In some embodiments, the first method may further include the steps of: disposing a first electrode and a second electrode between the first and the second substrates, and disposing the electro-active layer between the first and the second electrodes. In some embodiments, the electro-active layer may comprise a liquid crystal material.

In some embodiments, in the first method as described above where the adhesive material may comprise a curable resin, the first method may further include the steps of curing the resin. In some embodiments, the step of curing the resin may comprise using any one of, or some combination of: chemical additives, ultraviolet radiation, an electron beam, or heat.

In some embodiments, in the first method as described above, the adhesive may be configured to couple the first substrate to the second substrate.

In some embodiments, in the first method as described above, the adhesive may comprise any one of, or some combination of epoxy, polyurethane, acrylic, or cyanoacrylate.

However, embodiments are not so limited and any suitable adhesive may be utilized. In addition, the inventors have found that the adhesives disclosed in U.S. application Ser. No. 13/045,961, filed Mar. 11, 2011, which is hereby incorporated by reference herein in its entirety, may be utilized in some embodiments.

In some embodiments, in the first method as described above, the adhesive may be formulated to match the refractive index of the substrates. Matching the index may be preferred because, for instance, when the indexes are matched there is not interface (created by different indexes of refraction) that may affect the light that passes through the substrates and the adhesive material thereby creating an optical effect that may need to be accounted for an ophthalmic or other type of lens.

In some embodiments, a process may be provided that allows for a range of curvature differences between two substrates, wherein said process takes into account the measured curvature of each surface, and based on said measurements, a precise amount of adhesive may be dispensed in the appropriate amount such that an optimal assembly is achieved.

In some embodiments, a process may be provided by which cosmetic defects are avoided by the precise dispensing of adhesive (e.g. resin) volumes based on the measured topographic surfaces of the top and bottom substrates.

CONCLUSION

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary.

As used herein, reference to a "first" or a "second" does not limit the referenced component to a particular location unless expressly stated. For instance, reference to a "first temple" may comprise the temple located on either the left side or the right side of a wearer's head.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A first method of manufacturing a composite lens comprising:
    measuring a first surface disposed on a first substrate;
    measuring a second surface disposed on a second substrate;
    calculating a variable gap between the first surface and the second surface at different corresponding portions of the first and second surfaces;
    depositing at the different corresponding portions of the first and second surfaces a variable amount of adhesive on the first surface of the first substrate based at least in part on the calculation of the variable gap at the different corresponding portions; and
    placing the second substrate over the first substrate to form the composite lens, wherein the adhesive is disposed between the first surface of the first substrate and the second surface of the second substrate.

2. The first method of claim 1, wherein the step of depositing the variable amount of adhesive comprises depositing a plurality of dots of adhesive on the first surface.

3. The first method of claim 2, wherein each of the plurality of dots comprises approximately the same amount of adhesive.

4. The first method of claim 3, wherein depositing a variable amount of adhesive comprises depositing the plurality of dots at different intervals across the first surface.

5. The first method of claim 2, wherein the amount of adhesive of the plurality of dots varies by at least 5%.

6. The first method of claim 2, wherein the amount of adhesive of the plurality of dots varies by at least 20%.

7. The first method of claim 2, wherein the amount of adhesive of the plurality of dots varies by at least 50%.

8. The first method of claim 2, wherein the plurality of dots are deposited non-uniformly.

9. The first method of claim 1, wherein the step of measuring the first surface of the first substrate comprises measuring a radius of curvature of the first surface.

10. The first method of claim 9, wherein the step of measuring the second surface of the second substrate comprises measuring a radius of curvature of the second surface.

11. The first method of claim 10, wherein calculating the variable gap comprises determining a difference in the radius of curvature of a portion of the first surface of the first substrate and the radius of curvature of a corresponding portion of the second surface of the second substrate.

12. The first method of claim 1, wherein the step of measuring the first surface of the first substrate comprises measuring one or more topographical features of the first surface.

13. The first method of claim 12, wherein the step of measuring the second surface of the second substrate comprises measuring one or more topographical features of the second surface.

14. The first method of claim 13, wherein calculating the variable gap comprises determining a difference in the topographical features of a portion of the first surface of the first substrate and the topographical features of a corresponding portion of the second surface of the second substrate.

15. The first method of claim 1, further comprising the step of determining a first feature of the first substrate or the second substrate, wherein depositing the variable amount of adhesive is further based at least in part on the first feature.

16. The first method of claim 15, wherein the first feature comprises any one of, or some combination of: the area of the first surface, the area of the second surface, the shape of the first substrate, or the shape of the second substrate.

17. The first method of claim 15, wherein the first feature comprises any one of, or some combination of: a location of a diffractive surface or a location of an electro-active element disposed on the first surface of the first substrate or the second surface of the second substrate.

18. The first method of claim 1, further comprising the step of disposing an electro-active layer between the first and second substrates.

19. The first method of claim 18, further comprising the steps of:
    disposing a first electrode and a second electrode between the first and the second substrates; and
    disposing the electro-active layer between the first and the second electrodes.

20. The first method of claim 18, wherein the electro-active layer comprises a liquid crystal material.

21. The first method of claim 1, further comprising the steps of:
    determining the viscosity of the adhesive, and
    adjusting the amount of adhesive deposited based at least in part on the determined viscosity.

22. The first method of claim 21, wherein the step of determining the viscosity of the adhesive comprises:
    dispensing a plurality of dots of adhesive having a first weight at a first temperature;
    dispensing a plurality of dots of adhesive having a second weight at a second temperature; and
    calculating the temperature required to produce the desired weight.

23. The first method of claim 1, wherein the adhesive comprises a curable resin, and wherein the first method further comprises the step of curing the resin.

24. The first method of claim 23, wherein curing the resin comprises using any one of, or some combination of: chemical additives, ultraviolet radiation, an electron beam, or heat.

25. The first method of claim 1, therein the step of depositing the variable amount of adhesive comprises ink-jet deposition.

26. The first method of claim 1, further comprising the step of adjusting the amount of adhesive deposited based on any one of, or some combination of: level of heat, ambient temperature, or humidity.

27. The first method of claim 1, further comprising the steps of determining a characteristic of a deposition mechanism and adjusting the amount of adhesive deposited based at least in part on the determination of the characteristic of a deposition mechanism.

28. The first method of claim 1, wherein the adhesive is configured to couple the first substrate to the second substrate.

29. The first method of claim 1, wherein the adhesive comprises any one of, or some combination of: epoxy, polyurethane, acrylic, or cyanoacrylate.

30. The first method of claim 1, wherein the adhesive is formulated to match the refractive index of the substrates.

* * * * *